July 14, 1942. E. B. PRETTYMAN 2,289,680
ARTIFICIAL TREE
Filed April 10, 1941 2 Sheets-Sheet 1

Inventor:
Elijah Barrett Prettyman,
By Cushman Darby & Cushman
Attorneys.

July 14, 1942.  E. B. PRETTYMAN  2,289,680
ARTIFICIAL TREE
Filed April 10, 1941  2 Sheets-Sheet 2
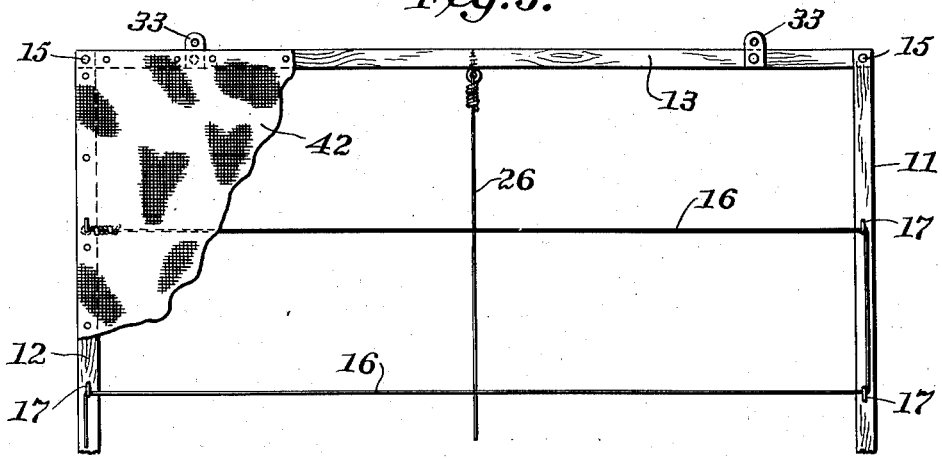
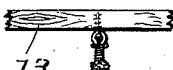
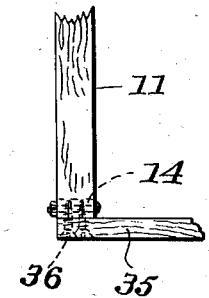
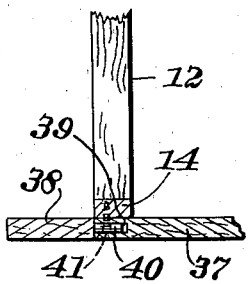
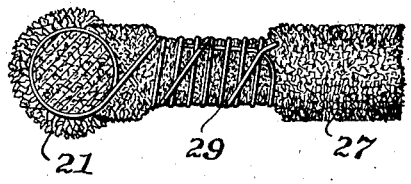
Inventor:
Elijah Barrett Prettyman,
By
Attorneys.

Patented July 14, 1942

2,289,680

UNITED STATES PATENT OFFICE 2,289,680

ARTIFICIAL TREE

Elijah Barrett Prettyman, Kenwood, Md.

Application April 10, 1941, Serial No. 387,944

9 Claims. (Cl. 41—15)

The present invention relates to ornamental objects, and more particularly to artificial trees and the like.

An object of the invention is the provision of an artificial tree, such as a Christmas tree, which is not only highly ornamental, but so constructed as to occupy a minimum of space. This is a desirable feature where room space is at a premium, and where the usual Christmas tree, with its spreading branches occupies a considerable area, even if placed in the corner of a room.

These desired results are obtained by constructing the tree so that it extends in substantially a single plane and may, therefore, be supported on or adjacent a wall of a room. In the preferred embodiment of the invention, the tree comprises a support, preferably in the form of a frame, having branch supporting wire-like elements extending across the support in spaced relation. A trunk simulating element is supported between the top and bottom of the support, and branch simulating elements extend laterally of the trunk and have their outer ends supported on the wire-like elements. Ornaments are detachably suspended from the wire-like elements in such a manner as to create the impression that they are supported from the branches. A Christmas tree constructed in this manner is highly ornamental and the space it occupies is negligible. Thus, the use of the tree does not necessitate rearrangement or crowding of the furniture in the room.

Another object is to provide an artificial tree which is collapsible, and, therefore, capable of being easily and quickly assembled, or knocked down and stored in a compact bundle.

With the foregoing and other objects in view, the invention will now be more particularly described, reference being had to the accompanying drawings, in which:

Figure 3 is a fragmentary view of a modified form of the tree frame.

Figure 4 is a fragmentary view of the tree showing a modified form of the trunk simulating element.

Figure 5 is a further modification of the trunk simulating element.

Figure 6 is a section through the top of the frame showing a modification of the means for suspending the frame.

Figure 7 is a fragmentary view showing one means for supporting the frame from its base.

Figure 8 is a fragmentary view showing a modified means for supporting the frame from its base, and Figure 9 is an enlarged view showing one means of securing a branch to its trunk.

Figure 1:
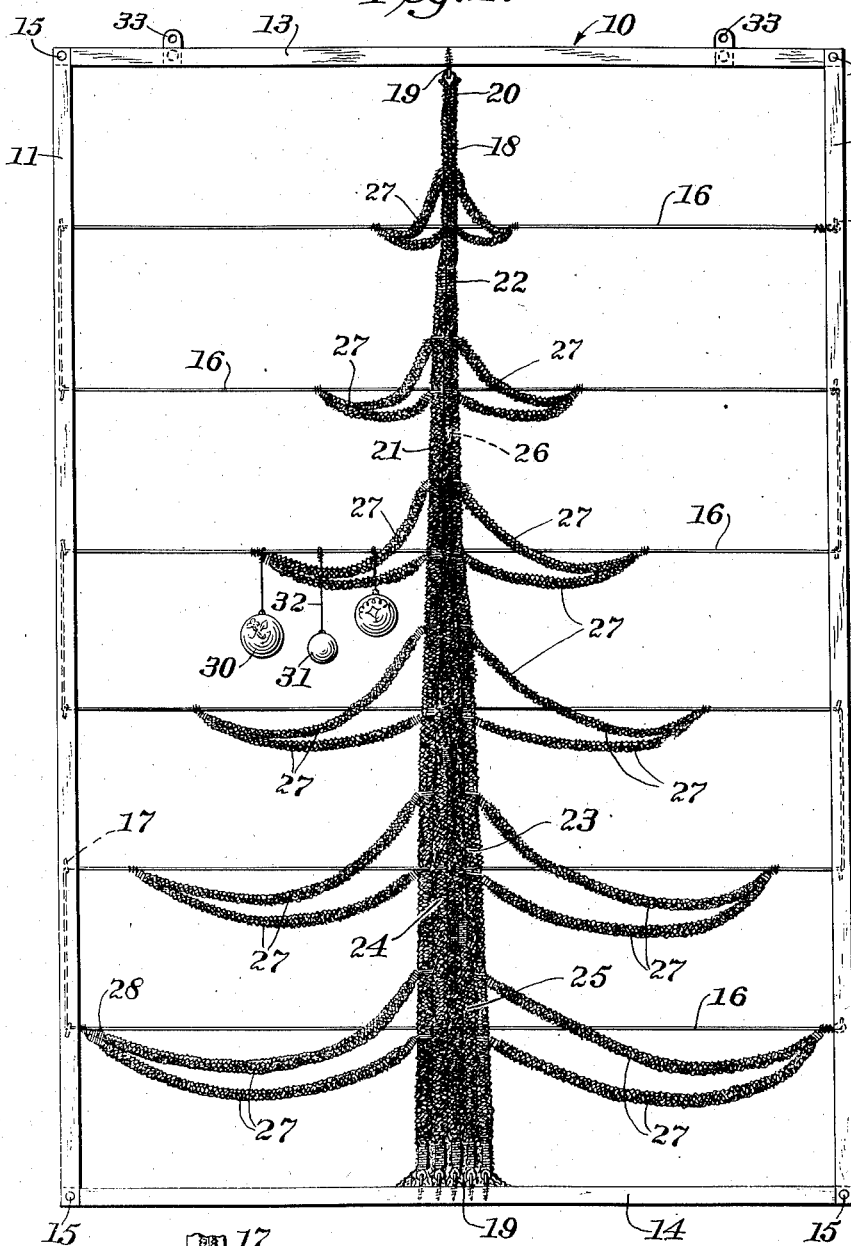
Figure 1 is an elevational view of the assembled tree, viewing the same from the rear.
Figure 2:
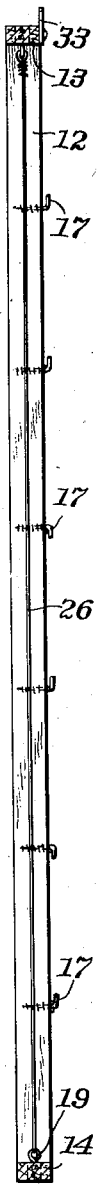
Figure 2 is a vertical section through the tree frame.

Referring to Figures 1 and 2, there is disclosed the preferred form of the invention in which the numeral 10 designates a tree support, which, in the present instance, is in the form of a frame. This frame is preferably of a collapsible construction and comprises side frame members 11 and 12, and top and bottom end members 13 and 14, respectively. These frame members may be detachably connected in any desirable manner, and as shown in Figures 1 and 2, the upper and lower end members 13 and 14 are provided with tongues which fit into complementary grooves in the side frame members 11 and 12. Screws, bolts or other fastening means 15 pass through the tongues and grooves to provide a rigid knockdown frame construction. It is to be understood that any other fastening means, such as corner brackets or the like, may be utilized if desired.

Supported on the frame are a plurality of spaced wire-like elements 16, which are adapted to support the tree branches and ornaments, as will be hereinafter described in greater detail. These wires may consist of separate pieces extending across the frame from the side frame members 11 and 12, but I prefer to utilize a single piece which is looped back and forth between the side frame members, as clearly shown in Figures 1 and 2. In this connection, the rear faces of the side frame members are provided with uniformly spaced screw hooks 17 of any desired formation. In assembling the wire 16 on the frame, one end is first secured to the top hook 17 of the side frame member 12. This piece of wire is then stretched across the frame and drawn taut over the corresponding hook on the side member 11, and drawn down on this member to the next lowest hook. The wire is then passed across the frame to engage the next lowest hook on the side frame member 12, and this operation is continued until the wire has completely engaged all of the hooks, the lower end of the wire being secured to the lowest hook on the side frame member 12. These hooks are preferably secured to the rear face of the frame so that they will be hidden from view when the tree is assembled, and, therefore, not detract from its ornamental appearance.

After the wire 16 has been assembled, the tree trunk is next built up centrally and longitudinally of the frame. In the preferred embodiment, this trunk comprises a plurality of pieces of tinsel-like material of different lengths. It is to be understood, however, that instead of tinsel, rope of paper, fabric, or any other desired material or color may be utilized to form the trunk.

Referring particularly to Figure 1, the numeral 18 designates the central and longest piece of tinsel which extends from top to bottom of the frame, where it is secured to upper and lower screw eyes or hooks 19. Any means may be employed for fastening the ends of the tinsel to the hooks, but I prefer to utilize pieces of thin wire 20 which are wrapped around the ends of the tinsel and pass through the eyes of the hooks 19. A second piece of tinsel 21 extends longitudinally of the piece 18, and is preferably secured thereto at a point below the first cross wire 16. A piece of wire 22, similar to the wires 20, is wrapped around the pieces 18 and 21 to secure them together, as clearly shown in Figure 1. It will be observed that the piece 21 extends downwardly at an angle to the center piece 18 and is, therefore, spaced therefrom at the base 14 of the frame.

A third piece of tinsel 23 also has its top end secured to the center piece of tinsel 18 at a point somewhat below the top of the piece 21. This piece 23 also tapers downwardly away from the center piece, and, similar to piece 21, is secured at its lower end to one of the screw eyes 19. A fourth piece of tinsel 24 is positioned between the center piece 18 and the piece 21, and has its upper end secured to the center piece at a point below the upper termination of the piece 23. A final piece 25, which is the smallest of the pieces, is located between the center piece 18 and the piece 23, and extends to a point below the top of the piece 24. This arrangement of the pieces of tinsel is designed to form a tree trunk tapering gradually from top to bottom, whereby its base will be of substantially greater width or thickness than its extreme top portion. It is to be understood that the arrangement of the pieces of tinsel as above described is one of many embodiments of the invention, and that a greater or less number of pieces may be used, as desired. For instance, the longer pieces 21 and 23 could have their lower ends positioned adjacent the center piece, while the pieces of less width 24 and 25, could be on the outside. The main requisite is that the tinsel, rope or other material used, will simulate the general outline and shape of the trunk of a small tree.

As shown particularly in Figure 2, a central longitudinally extending wire 26 is preferably stretched between the upper and lower end frame members 13 and 14 and attached to the same hooks 19 as the center piece of tinsel 18. This wire will be located directly behind this piece of tinsel and will, therefore, constitute a longitudinal support for the trunk without being visible from the front of the frame. While I prefer to utilize a wire of this character, it is to be understood that it is not entirely necessary and that the trunk formed of the pieces of tinsel as above described will have sufficient strength and body to support the ends of the limbs or branches without the wire 26.

The cross wires 16 may be unevenly spaced from each other, but as shown in Figure 1, I prefer that they be uniformly spaced, and thereby function to support the outer ends of uniformly spaced branches, thus providing a symmetrical tree construction. The numeral 27 designates branch simulating elements which gradually increase in spread from the top to the bottom of the trunk. Each branch element consists of two pieces or strands of tinsel-like material, which are connected together at their outer ends by a fine wire 28, similar to the wires 20 and 22. The wire 28 is of sufficient length to permit it to be wrapped around one of the cross wires 16, so that the outer end of the branch 27 will be adequately supported on the frame. The pieces of tinsel forming the branch are suspended in draped or looped formation intermediate their ends and gradually separate toward their inner ends so that the whole effect is a simulation of a symmetrical Christmas tree. As shown in Figure 1, the inner ends of these branch pieces are secured to one of the pieces of tinsel forming the trunk. For instance, the inner ends of the lower left-hand branch strands are secured in spaced relation to the trunk-forming piece 21, while the inner ends of the lower right-hand branch strands are secured to section 23 of the trunk.

Referring particularly to Figure 9, there is disclosed an enlarged view of one means of attaching the inner end of each branch strand to its respective piece of trunk tinsel. One end of the wire 29 is first wrapped or coiled around the end of the strand which is then placed in contact with the trunk piece. The wire is then crossed over around the trunk piece, brought back and finally wrapped upon the first piece of the wire on the end of the branch, thus forming an efficient connection between the trunk and the branch. In the drawings, the different wires for connecting the branch elements and the trunk elements are somewhat accentuated, and it is to be understood that in the tree as actually built, the wire connections will be substantially hidden by the tinsel, so that the branches in effect will appear as integral parts of the trunk. Likewise, the ends of the pieces of tinsel or rope forming the trunk will merge into their adjacent pieces so as to form an ornamental trunk tapering downwardly and outwardly from its top to bottom.

Figure 1A:
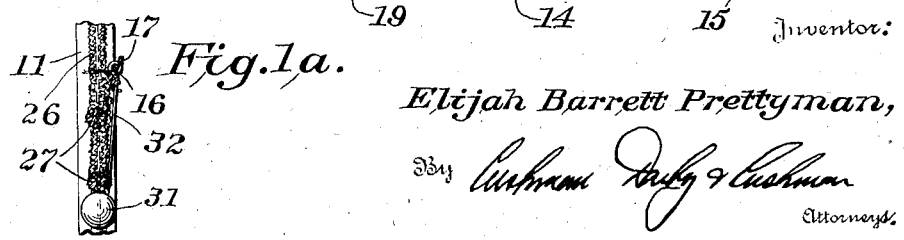
Figure 1a is a fragmentary vertical section through one of the branches showing the manner of suspending an ornament from one of the cross wires.

After the branches have been secured to the cross wires and the trunk, the tree is substantially complete and ready to receive the tree ornaments. These ornaments may be of any desired formation, and in Figure 1 are illustrated as different sized balls 30 and 31. Any suitable means, such as the usual ornament fastening wires, may be utilized to secure the ornaments to the frame. These wires are attached directly to their respective cross wire 16 in such a manner as to give the appearance of hanging from the branch instead of the cross wire. To accentuate this illusion, the fastening wires 32 are preferably formed of varying lengths, as shown in Figure 1, and are engaged over the wire 16 behind the branch simulating pieces 27. This arrangement not only gives the ornaments the appearance of hanging directly from the branch, but also tends to anchor the balls against movement on the cross wire 16. As shown in Figure 1a, each ornament wire 32 hangs down from its cross wire 16 and positively contacts at least one of the strands forming the branch 27. Due to the particular formation of the tinsel, this will tend to retain or lock the fastening wires against lateral movement on their respective cross wires 16, and will thus maintain the balls in the position in which they are originally suspended from the frame. It is to be understood that, if desired, the ornaments may all be suspended in a horizontal line, that is, with the fastening wires of the same length.

In order to suspend or hang the frame from the wall of a room or other support, perforated brackets 33 are secured to the top end member 13. These brackets are engageable with suitable supporting elements, such as nails or hooks secured to the wall. As an alternative form, Figure 6 shows a plurality of hooks 34, which may be engaged in suitable screw eyes secured in the wall or other supporting surface.

In the event that the frame is to be supported upon the floor instead of being hung from the wall, the lower end frame member 14 is provided with a pair of foot portions 35 (see Figure 7), which project forwardly so that the frame may be set against the wall. These foot portions may be secured to the frame member 14 by screws or other fastening elements 36.

If it is desired to place the frame in a position spaced from the wall, the supporting arrangement shown in Figure 8 is utilized. In this connection, pairs of foot portions 37 and 38 are secured to the bottom frame member 14. The portion 37 is preferably provided with a socket 39, while the portion 38 has a pin 40 projecting therefrom and engageable in the socket 39. A screw or other fastening means 41 secures the foot portions to each other and to the bottom frame member 14.

Figure 3 discloses a further modification in which a backing of cloth, paper, or other suitable material 42 is secured to the back of the frame 10. This backing is preferably of the same shade or color as the cross wires 16 so as to render these wires inconspicuous. This backing may be simply tacked or otherwise secured to the frame.

Figure 4 illustrates a modified form of trunk which consists of only one string of tinsel or rope 43. If desired, this may be substituted for the trunk shown in Figure 1, but, of course, it will not resemble the trunk of a tree as much as the form shown in Figure 1. In this connection, a wire similar to the wire 26 may be used in conjunction with the string of tinsel 43.

Figure 5 shows a further modification of trunk, which is primarily formed from the usual type of paper rope, in which either a plurality of paper discs 44 or a continuous strip of paper is wrapped about or connected to a central wire or cord 45. The usual type of paper rope is of substantially the same diameter throughout its length, and before applying this to the frame, it is preferable that the paper be cut so as to provide a taper which extends downwardly and outwardly, whereby the trunk is of greater diameter at its base.

If desired, the trunk may be formed by wrapping paper or fabric rope about a wire, with the wrapping increasing in diameter toward the base of the trunk. The branch simulating elements may also be formed so as to extend entirely across the frame. That is, each element would comprise two branches and be looped from end to end across the trunk, with each end being secured to its respective cross wire 16. As a further alternative each branch simulating element may be formed of more than two pieces or strands. That is, each element may be composed of three or more pieces all secured together at their outer ends.

It is to be understood that the artificial Christmas tree as above described, may be sold or distributed in any desired manner. For instance, all of the different elements may be furnished entirely separated or segregated from one another, so that it will be necessary for the purchaser to entirely assemble the tree in the manner set forth above. Under these circumstances, the frame will come in four separate pieces, with any convenient fastening means. The wire will be supplied in a single roll or ball, so that it may be unwound to form the sets of cross wires 16. Preferably this wire is also used for connecting the trunk elements and the branch elements together. In this arrangement, the branch elements will all consist of the single strands or pieces of material, which will first have to be secured together before attachment to the cross wires and trunk.

It is to be understood, however, that the tree may be manufactured for distribution with certain of the elements connected or attached together. That is, the trunk illustrated in Figure 1 may be furnished in its completely assembled condition so that it will be necessary merely to secure the top and bottom ends to the frame sections 13 and 14. The two pieces of each branch may likewise be furnished with their outer ends secured together. Thus, it would merely be necessary to secure the outer end of the branch to its respective cross wire and the inner ends to the trunk. As an alternative arrangement, the tree could be furnished with the inner ends of the branches attached to the trunk so that after the trunk is secured to the frame, the only requirement would be to loop or drape the branches and secure the outer ends thereof to their respective cross wires.

As a still further modification, it is possible that the entire tree, including the trunk and branches, may be mounted on a piece of material, such as paper, which may be readily separated from the tree. After the frame and wires have been erected, the various portions of the tree simulating elements, as illustrated in Figure 1, may be attached to the frame and then the paper torn off. By this construction, there would be assured a fastening of the branch wires in a predetermined manner as indicated by the paper mounting.

From the foregoing, it will be apparent that there are numerous modifications of the present invention, both in the formation of the several elements and in the manner of distribution of the trees for subsequent assembly upon the frame. It is to be understood, however, that regardless of the different variations, the primary requisites of the invention comprise a support having a plurality of spaced wire-like elements extending across the same, and an artificial tree supported within the support and including a trunk simulating element extending across the wires, and a plurality of branch simulating elements extending laterally of the trunk in the general direction of the lengths of the wires and having their outer ends supported on said wires. As will be understood, the support may be of any character suitable to suspend the transversely extending wire-like elements herein described.

It is to be further understood that in the claims the term "branch supporting wires" is to be broadly interpreted as including either a single wire looped back and forth over the support, or a plurality of separate wires; furthermore, that the term "wire" is to be broadly construed to include cord, string, or similar material.

I claim:

1. An artificial tree comprising a support, a plurality of spaced branch supporting wires extending across the support, a trunk simulating element carried by the support and extending across the wires, and a plurality of branch simulating elements extending laterally of the trunk in the general direction of the lengths of the wires and having their outer ends supported on said wires, their inner ends supported adjacent the trunk simulating element, and their intermediate portion hanging in festoon form free of the wires.

2. An artificial tree comprising a support, a plurality of spaced branch supporting wires extending across the support, a trunk simulating element, carried by the support and extending across the wires, and a plurality of flexible branch simulating elements extending laterally of the trunk in the general direction of the lengths of the wires, the inner ends of said branch elements being connected to the trunk element, and the outer ends of said branch elements being supported on the wires.

3. An artificial tree comprising a support, a plurality of spaced branch supporting wires extending across the support, a trunk simulating element carried by the support and extending across the wires, and a plurality of flexible branch simulating elements extending laterally of the trunk in the general direction of the lengths of the wires, each element comprising a plurality of pieces of tinsel-like material connected at their outer ends to one of the wires, said pieces of tinsel being looped between their ends and having their inner ends supported in spaced relation on said trunk element.

4. An artificial tree comprising a support, a plurality of spaced branch supporting wires extending across the support, a trunk simulating element comprising a plurality of strings of flexible ornamental material carried by the support and extending across the wires, and a plurality of branch simulating elements extending laterally of the trunk in the general direction of the lengths of the wires and having their outer ends supported on said wires.

5. An artificial tree comprising a frame consisting of spaced side frame members and end members joining the side members, a plurality of spaced branch supporting wires extending across the frame between the side frame members, a trunk simulating element comprising a plurality of strings of tinsel-like material of varying lengths, one of said strings extending substantially between the two end frame members, the rest of said strings having their lower ends secured to the lower end frame member and their upper ends secured to intermediate portions of the other strings of greater length, and a plurality of branch simulating elements extending laterally of the trunk in the general direction of the lengths of the wires and having their outer ends supported on said wires.

6. An artificial tree comprising a support, a plurality of spaced branch supporting wires extending across the support between the side frame members, a trunk simulating element, carried by the frame and extending across the wires, a plurality of branch simulating elements extending laterally of the trunk in the general direction of the lengths of the wires and having their outer ends supported on said wires, said support including a backing of substantially the same shade as the branch supporting wires.

7. An artificial tree comprising a support, a plurality of spaced branch supporting wires extending across the support, a trunk simulating element carried by the support and extending across the wires, a plurality of flexible branch simulating elements extending laterally of the trunk in looped formation in the general direction of the lengths of the wires, the inner ends of said branch elements being connected to the trunk element, and the outer ends of said branch elements being supported on the wires, and a plurality of sets of ornaments, each set comprising a plurality of ornaments supported in spaced relation upon one of said wires, said ornaments being attached to the wire so that they hang below their respective branch element and give the appearance of being suspended directly from said branch element.

8. An artificial tree comprising a frame, a plurality of spaced branch supporting wires extending across the frame, a trunk simulating element carried by the frame and extending across the wires, a plurality of flexible branch simulating elements extending laterally of the trunk in looped formation in the general direction of the lengths of the wires, the inner ends of said branch elements being connected to the trunk element, and the outer ends of said branch elements being supported on the wires, a plurality of sets of ornaments, each set comprising a plurality of ornaments supported in spaced relation upon one of said wires, and connecting elements for attaching said ornaments to their respective wire, said elements being of varying lengths to permit the ornaments to follow the looped formation of their respective branch element and give the appearance of being suspended directly from said branch element.

9. An artificial tree comprising a frame consisting of spaced side frame members and end members joining the side members, a plurality of spaced branch supporting wires extending across the frame between the side frame members, a trunk simulating element supported within the frame and extending across the wires, said element comprising a string of paper rope tapering in diameter from top to bottom of the frame, and a plurality of branch simulating elements extending laterally of the trunk in the general direction of the lengths of the wires and having their outer ends supported on said wires.

ELIJAH BARRETT PRETTYMAN.